(12) United States Patent
Hou et al.

(10) Patent No.: US 11,374,422 B2
(45) Date of Patent: Jun. 28, 2022

(54) SINGLE-INTERFACE CHARGING-DISCHARGING SWITCHABLE CIRCUIT

(71) Applicant: Shenzhen Apeman Innovations Technology Co., Ltd., Shenzhen (CN)

(72) Inventors: Jun Hou, Shenzhen (CN); Lianfu Huang, Ganzhou (CN)

( * ) Notice: Subject to any disclaimer, the term of this patent is extended or adjusted under 35 U.S.C. 154(b) by 0 days.

(21) Appl. No.: 17/038,052

(22) Filed: Sep. 30, 2020

(65) Prior Publication Data

US 2021/0391728 A1 Dec. 16, 2021

(30) Foreign Application Priority Data

Jun. 10, 2020 (CN) .......................... 202010524487.9

(51) Int. Cl.
*H02J 7/00* (2006.01)
(52) U.S. Cl.
CPC ............ *H02J 7/007* (2013.01); *H02J 7/0049* (2020.01); *H02J 7/00304* (2020.01); *H02J 7/0029* (2013.01); *H02J 7/00309* (2020.01); *H02J 7/00712* (2020.01)
(58) Field of Classification Search
CPC ...... H02J 7/007; H02J 7/0049; H02J 7/00304; H02J 7/00309

USPC ................ 320/134, 136, 140, 152, 158, 163
See application file for complete search history.

(56) References Cited

U.S. PATENT DOCUMENTS

| 2015/0256013 | A1* | 9/2015 | Wen | H02J 7/342 320/107 |
|---|---|---|---|---|
| 2017/0063112 | A1* | 3/2017 | Takahashi | H02J 7/00302 |
| 2017/0127726 | A1* | 5/2017 | Xiang | A24F 40/60 |
| 2021/0036524 | A1* | 2/2021 | Womac | H02M 3/156 |

* cited by examiner

*Primary Examiner* — Edward Tso
*Assistant Examiner* — Aaron Piggush
(74) *Attorney, Agent, or Firm* — Sandy Lipkin

(57) ABSTRACT

A single-interface charging-discharging switchable circuit comprising a power management unit U1, field effect transistors Q1~Q2, capacitors C1~C5, resistors R1~R8, a diode D1 and an inductor L1. The product fills the gap in the market where there is no automatic charging-discharging switching circuit with the same interface, which enables the same interface (VCC/GND) to realize discharging and charging functions. The circuit of the disclosure is simple and has broad application prospects. The product of the disclosure uses a 5V-30V power supply to charge, and mobile phone adapters, portable power supply and other 5V power supply can be used as chargers. It is not limited by the 5V voltage of the traditional power supply, and the range of the input voltage of charging is wide.

6 Claims, 3 Drawing Sheets

US 11,374,422 B2

SINGLE-INTERFACE CHARGING-DISCHARGING SWITCHABLE CIRCUIT

RELATED APPLICATIONS

The present disclosure claims priority to Chinese Patent Application 202010524487.9, filed on Jun. 10, 2020, which is incorporated herein by reference.

FIELD OF THE DISCLOSURE

The disclosure relates to the field of electronic technology, and specially relates to a single-interface charging-discharging switchable circuit, in particular to be used in the charging management of lithium batteries or lead-acid batteries.

BACKGROUND

Most of the existing electronic control circuits have dual-interfaces: one used for input and the other used for output. The existing circuits suffer problems such as low precision of the boosted output voltage, small and unstable continuous output current, and lack of under-voltage protection for the built-in lithium battery.

In addition, complicated and inconvenient operations need to be performed by operators for input or output. Furthermore, frequent plugging-unplugging operations can easily do damage to the interface, causing the device to be unusable or scrapped, leading to scrapped power supplies (or batteries) and environmental pollution.

For example, most common portable power supplies have dual-interfaces, one standard universal serial bus (USB) structural interface for input and another mini USB, type-C or Apple interface for power output. Other single-in, double-out, or multiple-out structures are variations of the foregoing structure. When the interface of the portable power supply is damaged, consumers tend to buy new ones and discard the old ones directly, causing lots of waste of resources and environmental pollution.

Moreover, the existing power supplies are of low charging efficiency and unstable current. In particular, the existing power supplies cannot output stable and continuous current above 3A, easily causing electrical failure or even damage to the electrical equipment/charging equipment.

Thus, it is necessary to develop a novel charging-discharging management circuit to meet the demand for high-power, continuous, and stable charging, and to develop the market for single-interface charging-discharging devices.

SUMMARY OF THE DISCLOSURE

In view of the above-mentioned shortcomings of the prior art, the disclosure provides a single-interface charging-discharging switchable circuit as follows:

a single-interface charging-discharging switchable circuit, including a power management unit (PMU) U1, field effect transistors Q1~Q2, capacitors C1~C5, resistors R1~R8, a diode D1 and an inductor L1; wherein, the power management unit U1 includes an LED (charging indicator), an LVD (discharging indicator), an EN (enabling control boost) port, a VDD (internal system power supply) port, a GND (system ground) port, a VSET/NTC (battery voltage selection) port, a CS (charging current detection) port, a BATT (battery connection) port, a GN (low-end MOS gate drive) port, a SW (connected inductor) port, a GP (high-end MOS gate drive) port, a VHS (high-end MOS bootstrap) port, a VCC (DC-DC output) port, an FBH (feedback high) port, an FBL (feedback low) port, a DCIN (low-voltage charging input detection) port, and an EPAD (bottom heat sink) port;

one end of the resistor R1, one end of the resistor R2, and the anode of the diode D1 are connected together as the DCIN port in the circuit; the other end of the resistor R1 is grounded; the other end of the resistor R2 is connected with the DCIN port of the power management unit U1;

the cathode of the diode D1, one end of the resistor R5, the VCC port of the power management unit U1, one end of the capacitor C1, one end of the capacitor C2, and the source of the field effect transistor Q1 are connected together as the VCC port in the circuit; the other end of the capacitor C1 is connected with the VHS port of the power management unit U1; the other end of the capacitor C2 is grounded;

the other end of the resistor R5 is connected with the FBH port of the power management unit U1 and one end of the resistor R4;

the other end of the resistor R4 is connected with the FBL port of the power management unit U1 and one end of the resistor R3; the other end of the resistor R3 is grounded;

the gate of the field effect transistor Q1 is connected with the GP port of the power management unit U1; the drain of the field effect transistor Q1 is connected with the SW port of the power management unit U1, the drain of the field effect transistor Q1 and one end of the inductor L1;

the gate of the field effect transistor Q2 is connected with the GN port of the power management unit U1; the source of the field effect transistor is grounded;

the other end of the inductor L1 is connected with the BATT port of the power management unit U1 and one end of the capacitor C4; one end of the resistor R7 is connected with one end of the resistor R8;

the co-node of the other end of the inductor L1, the BATT port of the power management unit U1 and one end of the capacitor C4 is the positive electrode of the power supply in the circuit; the co-node of one end of the resistor R7 and one end of the resistor R8 is the negative electrode of the power supply in the circuit;

the other end of the resistor R7 is connected with the CS port of the power management unit U1 and one end of the capacitor C5; the other end of the resistor R8, the other end of the capacitor C4, the other end of the capacitor C5 and the GND port are all grounded;

the VSET/NTC port of the power management unit U1 is grounded via the resistor R6; Furthermore, the VSET/NTC (battery voltage selection) port is the port for battery voltage selection and temperature detection, which can be used for VSET/NTC (battery voltage selection), and also for NTC temperature detection;

the EN port of the power management unit U1 and the VDD port of the power management unit U1 are connected with one end of the capacitor C3; the other end of the capacitor C3 is grounded.

Furthermore, the power management unit U1 includes an LVD (low-voltage battery warning signal) port and an LED (charging indicator) port, wherein the LVD port is the LVD port in the circuit, used for low-voltage detection on battery when the power supply (or battery) is discharging; and the LED port is the LED port in the circuit, used as a charging indicator LED when the battery or power supply is charging.

Moreover, the circuit is an automatic charging-discharging switchable, 100WMAX synchronous boost and 1-3 cells lithium or lead-acid battery charging management circuit with an external power transistor and having the same interface and the single inductor, the circuit supports 5-24V input to charge lithium or lead-acid batteries with a maximum charging current up to 4 A.

In the circuit, D1, C1, C2, Q1, Q2, L1, C4, C5, R7 and R8 constitute a built-in charging switch control circuit with current-limiting function; the circuit is capable of constant current and constant voltage charging controlled by temperature regulation, and supports 0V charging for lithium battery, the circuit can regulate the preset voltage for fully charging the battery with a high-precision: VFULL=4.2V/8.4V/12.6V/14.1V (±1.0%); with a mechanism as follows:

the power management unit (PMU) U1 has an integrated Boost synchronous boost charging controller with a standby function and with a switching frequency of 350 KHz, when the pin EN (i.e. EN (enabling control boost) port, the "port" and the "pin" are synonymous in the disclosure) is connected to a high level, the boost operation is performed and an output voltage output from the VCC pin is set by feedback resistors; the feedback resistors refer to resistors R5, R4 and R3 in the circuit. The applications in the drawings are RH (R5), RM (R4), RL (R3).

$$V_{OUT} = \frac{R_5 + R_4 + R_3}{R_4 + R_3} \times V_{REF}$$

wherein, $V_{REF}$ is the reference voltage; $V_{OUT}$ is Vout.

Furthermore, the power supply (or battery) is connected between the positive electrode and the negative electrode of the power supply in the circuit; that is one end of the power supply (or battery) is connected with the co-node of the other end of the inductor L1, the BATT port of the power management unit U1 and one end of the capacitor C4, wherein the co-node is the positive electrode; the other end of the power supply (or battery) is connected with the co-node formed by one end of resistor R7 and one end of resistor R8, wherein the co-node is the negative electrode;

in the boost-discharging mode, the battery voltage is limited to not lower than the minimum voltage ($V_{MIN}$);

when the battery voltage is lower than the low voltage threshold ($V_{LVD}$), the LVD pin will switch from high impedance to low impedance, and the voltage will be converted from high level to low level;

when the battery voltage is lower than the locking threshold ($V_{UVLO}$), the chip will be locked.

| Battery Type | $V_{UVLO}$ | $V_{MIN}$ | $V_{LVD-}$ | $V_{LVD+}$ |
| --- | --- | --- | --- | --- |
| Lithium 1 cell | 2.83 V | 2.97 V | 3.40 V | 3.57 V |
| Lithium 2 cell | 5.66 V | 5.95 V | 6.80 V | 7.14 V |
| Lithium 3 cell | 8.50 V | 8.92 V | 10.2 V | 10.71 V |
| Lead-acid | 9.16 V | 9.62 V | 11.0 V | 11.55 V |

In the above table, Lithium 1 cell is a single-cell lithium battery, Lithium 2 cell is a 2-cell series-connected lithium battery, Lithium 3 cell is a 3-cell series-connected lithium battery, and Lead-acid is a lead-acid battery.

The charging critical point (VIN) at the VCC pin is regulated to the lowest level defined by the feedback resistors (R3, R4, and R5).

$$V_{IN} = \frac{R_3 + R_4 + R_5}{R_5} \times V_{REF}$$

in the discharging mode, the converter will detect the voltage $V_{OUT}$ and the voltage $V_{IN}$ of the VCC pin:

if the voltage of VCC is higher than the charging critical point ($V_{IN}$), the circuit will enter the charging mode;

if the voltage of VCC is lower than the charging critical point ($V_{IN}$), the circuit will enter the battery boost mode;

when the external adapter is connected to the VCC for power supply, the power of the adapter is not enough and the voltage is lower than the critical point ($V_{IN}$), the converter will boost the voltage to VOUT to supplement the power supply, which improves the reduced load capacity caused by insufficient power of the adapter, thus reducing the cost of the adapter power supply.

if no external adapter is connected to VCC for power supply or the voltage of VCC is lower than the charging critical point ($V_{IN}$), the circuit will enter the battery boost mode.

Moreover, the boost output voltage of the circuit is of high-precision:

$VOUT=5\sim24V(\pm 2.5\%)$;

The circuit can continuously output large current: IOP=6 A (when the total power is 120 W);

This circuit has under-voltage protection for the lithium battery: VUVLO=2.83V*N.

The LVD port of the circuit is connected to an external LED, which flashes when charging, and is normally on after full charging; the package form of the circuit is eLQFN16, 3×3 mm.

The power management unit U1 can be JH5700 manufactured by Shenzhen Jinhui Electronics Co., Ltd., and the preferred model is JH5700-ELQFN16.

Furthermore, the power management unit U1 includes a boost conversion module, a switch charging module, and an LDO regulator module.

the power management unit U1 includes: a PMU CHARGE module, a Synchronous BOOST module, a PUMP module, a first Vref module, an ICHARGE SET module, an EN module, a second $V_{REF}$ module, the field effect transistor, the resistor $R_{KEY}$ and an amplifier; wherein the PMU CHARGE module includes an LDO; the two output ports of the LDO are the LCD port and the VDD port of the chip respectively;

the two direct output ports of the PMU CHARGE module are the LED port and the BATT port of the chip respectively;

the output port of the PMU CHARGE module via the second $V_{REF}$ module (second VREF module) is the BSET port of the chip;

the output port of the PMU CHARGE module via the field effect transistor is the DCIN port of the chip;

the Synchronous BOOST module is connected with the PMU CHARGE module;

the Synchronous BOOST module has 5 direct output ports: the GND port, the GN port, the SW port, the GP port and the VCC port of the chip;

the output port of the node between the Synchronous BOOST module and the GP port via the PUMP is the VHS port of the chip;

the Synchronous BOOST module is connected with the amplifier; one port of the amplifier is the FBH port of the chip, and the other port of the amplifier is connected with the first Vref module; one output port of the first Vref module is the FBL port of the chip, and the other output port outputting through the ICHARGE SET module, is the CS port;

the Synchronous BOOST module is connected with one end of the EN module; the other end of the EN module is the EN port of the chip; the node of the EN module and the EN port of the chip is connected with one end of the resistor $R_{KEY}$.

BENEFICIAL TECHNICAL EFFECTS

In view of the above-mentioned shortcomings of the existing technology, our company (Shenzhen Jinhui Electronics Co., Ltd.) developed the JH5700 chip (the current iterative optimized model is JH5700-ELQFN16) and the charging-discharging circuit. The product fills the gap in the market where there is no automatic charging-discharging switching circuit with the same interface, which enables the same interface (VCC/GND) to realize both discharging and charging functions. The circuit of the disclosure is simple and has broad application prospects. The product of the disclosure uses a 5V-30V power supply to charge, and mobile phone adapters, portable power supply, and other 5V power supplies can be used as chargers. It is not limited to the 5V of traditional power supplies, and the range of input voltage of charging is wide.

The product of the disclosure uses a special charger for charging, and the charging power is automatically adapted and the maximum charging power is automatically limited. The product can be carried with you without the inconvenience of charging.

The product of the disclosure uses parallel batteries boosting power supply instead of the traditional 12V-24V series batteries, solving the problems of unbalanced and unsafe charging of traditional series batteries, greatly reducing the size of the battery pack, and making the product have the advantages of small size, light weight, and long service life.

DETAILED DESCRIPTION

The structural features of the disclosure will be described in connection with the accompanying drawings.

Figure 1:
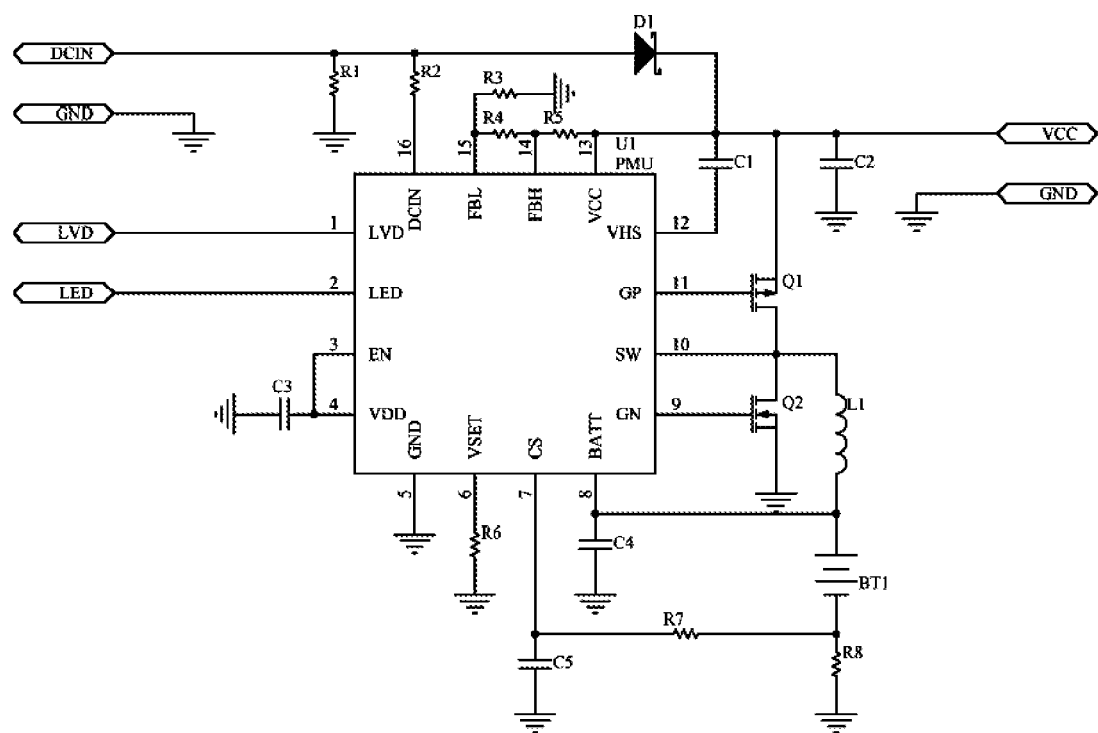
FIG. 1 is a schematic structural diagram of a circuit of the disclosure.

Referring to FIG. 1, a single-interface charging-discharging switchable circuit includes a power management unit (PMU) U1, field effect transistors Q1-Q2, capacitors C1-C5, resistors R1-R8, a diode D1, and an inductor L1.

The power management unit U1 includes a LED (charging indicator) port (pin 2), an LVD (discharging indicator) port (pin 1), an EN (enabling control boos) port (pin 3), a VDD (internal system power supply) port (pin 4), a GND (system ground) port (pin 5), a VSET/NTC (battery voltage selection, also marked as VSET) port (pin 6), a CS (charging current detection) port (pin 7), a BATT (battery connection) port (pin 8), a GN (low-end MOS gate drive) port (pin 9), a SW (connected inductor) port (pin 10), a GP (high-end MOS gate drive) port (pin 11), a VHS (high-end MOS bootstrap) port (pin 12), a VCC (DC-DC output) port (pin 13), an FBH (feedback high) port (pin 14), an FBL (feedback low) port (pin 15), and a DCIN (low-voltage charging input detection) port (pin 16). The power management unit U1 also includes an EPAD (bottom heat sink).

One end of the resistor R1, one end of the resistor R2, and the anode of the diode D1 are connected together as the DCIN port in the circuit. The other end of the resistor R1 is grounded, and the other end of the resistor R2 is connected with the DCIN port of the power management unit U1.

The cathode of the diode D1, one end of the resistor R5, the VCC port of the power management unit U1, one end of the capacitor C1, one end of the capacitor C2, and the source of the field effect transistor Q1 are connected together as the VCC port in the circuit. The other end of the capacitor C1 is connected with the VHS port of the power management unit U1, and the other end of the capacitor C2 is grounded.

The other end of the resistor R5 is connected with the FBH port of the power management unit U1 and one end of the resistor R4.

The other end of the resistor R4 is connected with the FBL port of the power management unit U1 and one end of the resistor R3. The other end of the resistor R3 is grounded.

The gate of the field effect transistor Q1 is connected with the GP port of the power management unit U1. The drain of the field effect transistor Q1 is connected with the SW port of the power management unit U1, the drain of the field effect transistor Q1, and one end of the inductor L1.

The gate of the field effect transistor Q2 is connected with the GN port of the power management unit U1. The source of the field effect transistor is grounded.

The other end of the inductor L1 is connected with the BATT port of the power management unit U1 and one end of the capacitor C4. One end of the resistor R7 is connected with one end of the resistor R8.

The co-node of the other end of the inductor L1, the BATT port of the power management unit U1, and one end of the capacitor C4 is the positive electrode of the power supply in the circuit. The co-node of one end of the resistor R7 and one end of the resistor R8 is the negative electrode of the power supply in the circuit.

The other end of the resistor R7 is connected with the CS port of the power management unit U1 and one end of the capacitor C5. The other end of the resistor R8, the other end of the capacitor C4, the other end of the capacitor C5, and the GND port are all grounded.

The VSET/NTC port of the power management unit U1 is grounded via the resistor R6. Furthermore, the VSET/NTC (battery voltage selection) port is the port for battery voltage selection and temperature detection, which can be used for VSET (battery voltage selection) and also for NTC (temperature detection).

The EN port of the power management unit U1 and the VDD port of the power management unit U1 are connected with one end of the capacitor C3, and the other end of the capacitor C3 is grounded.

Furthermore, the power management unit U1 includes an LVD (low-voltage battery warning signal) port and an LED (charging indicator) port, wherein the LVD port is the LVD port in the circuit, used for low-voltage detection on battery when the power supply (or battery) is discharging. The LED port is the LED port in the circuit, used as a charging indicator LED when the battery or power supply is charging.

Furthermore, the circuit is an automatic charging-discharging switchable, 100WMAX synchronous boost and 1-3 cells lithium or lead-acid battery charging management circuit with an external power transistor and having the same interface and a single inductor. The circuit supports 5-24V input to charge lithium or lead-acid batteries with a maximum charging current up to 4 A.

Furthermore, in the circuit, D1, C1, C2, Q1, Q2, L1, C4, C5, R7, and R8 constitute a built-in charging switch control circuit with current-limiting function. The circuit is capable of constant current and constant voltage charging controlled by temperature regulation and supports 0V charging for lithium batteries. The circuit can regulate the preset voltage for fully charging the battery with a high-precision:

$V$FULL=4.2V/8.4V/12.6V/14.1V(±1.0%), with a mechanism as follows.

The power management unit (PMU) U1 has an integrated Boost synchronous boost charging controller with a standby function and with a switching frequency of 350 KHz.

When the pin EN (i.e. EN (enabling control boost) port, the "port" and the "pin" are synonymous in the disclosure) is connected to a high level, the boost operation is performed and an output voltage output from the VCC pin is set by feedback resistors. The feedback resistors refer to resistors R5, R4, and R3 in the circuit. The applications in the drawings are RH (R5), RM (R4), RL (R3).

$$V_{OUT} = \frac{R_5 + R_4 + R_3}{R_4 + R_3} \times V_{REF}$$

wherein, $V_{REF}$ is the reference voltage, and $V_{OUT}$ is the voltage of VCC.

Furthermore, the power supply (or battery) is connected between the positive electrode and the negative electrode of the power supply in the circuit. That is one end of the power supply (or battery) is connected with the co-node of the other end of the inductor L1, the BATT port of the power management unit U1, and one end of the capacitor C4, wherein the co-node is the positive electrode. The other end of the power supply (or battery) is connected with the co-node formed by one end of resistor R7 and one end of resistor R8, wherein the co-node is the negative electrode.

Further, in the boost-discharging mode, the battery voltage is limited to not lower than the minimum voltage ($V_{MIN}$). When the battery voltage is lower than the low voltage threshold ($V_{LVD}$), the LVD pin will switch from high impedance to low impedance, and the voltage will be converted from high level to low level.

When the battery voltage is lower than the locking threshold ($V_{UVLO}$), the chip will be locked. The parameter table of low-voltage discharging protection for battery (the table below) is shown as follows:

Parameter Table of Low-Voltage Discharging Protection for Battery

| Battery Type | $V_{UVLO}$ | $V_{MIN}$ | $V_{LVD-}$ | $V_{LVD+}$ |
|---|---|---|---|---|
| Lithium 1 cell | 2.83 V | 2.97 V | 3.40 V | 3.57 V |
| Lithium 2 cell | 5.66 V | 5.95 V | 6.80 V | 7.14 V |
| Lithium 3 cell | 8.50 V | 8.92 V | 10.2 V | 10.71 V |
| Lead-acid | 9.16 V | 9.62 V | 11.0 V | 11.55 V |

In the above table, Lithium 1 cell is a single-cell lithium battery, Lithium 2 cell is a 2-cell series-connected lithium battery, Lithium 3 cell is a 3-cell series-connected lithium battery, and Lead-acid is a lead-acid battery. $V_{UVLO}$, $V_{MIN}$, $V_{LVD-}$, $V_{LVD+}$ mean respectively the lowest locked voltage and the highest locked voltage of the battery when discharged, the lowest voltage and the highest voltage of warning charging.

The charging critical point (VIN) at the VCC pin is regulated to the lowest level defined by the feedback resistors (R3, R4, and R5).

$$V_{IN} = \frac{R_3 + R_4 + R_5}{R_5} \times V_{REF}$$

Furthermore, in the discharging mode, the converter will detect the $V_{ouT}$ voltage and the $V_{IN}$ voltage of the VCC pin. If the voltage of VCC is higher than the charging critical point ($V_{IN}$), the circuit will enter the charging mode. If the voltage of VCC is lower than the charging critical point ($V_{IN}$), the circuit will enter the battery boost mode.

When the external adapter is connected to the VCC for power supply, the power of the adapter is not enough, and the voltage is lower than the critical point ($V_{IN}$), the converter will boost the voltage to VOUT to supplement the power supply, which improves the reduced load capacity caused by insufficient power of the adapter, thus reducing the cost of the adapter power supply.

Moreover, the boost output voltage of the circuit is of high-precision:

$$VOUT = 5 \sim 24V(\pm 2.5\%).$$

The circuit can continuously output large current: IOP=6 A (when the total power is 120 W).

This circuit has under-voltage protection for the built-in lithium battery:

$$VUVLO = 2.83V*N.$$

Furthermore, the LVD port of the circuit is connected to an external light emitting diode (LED), which flashes when charging and is normally on after full charging. The package form of the circuit is eLQFN16, 3×3 mm.

Furthermore, the power management unit U1 can be JH5700 manufactured by Shenzhen Jinhui Electronics Co., Ltd., and the preferred model is JH5700-ELQFN16.

Furthermore, the power management unit U1 includes a boost conversion module, a switch charging module, and an LDO regulator module.

Figure 2:
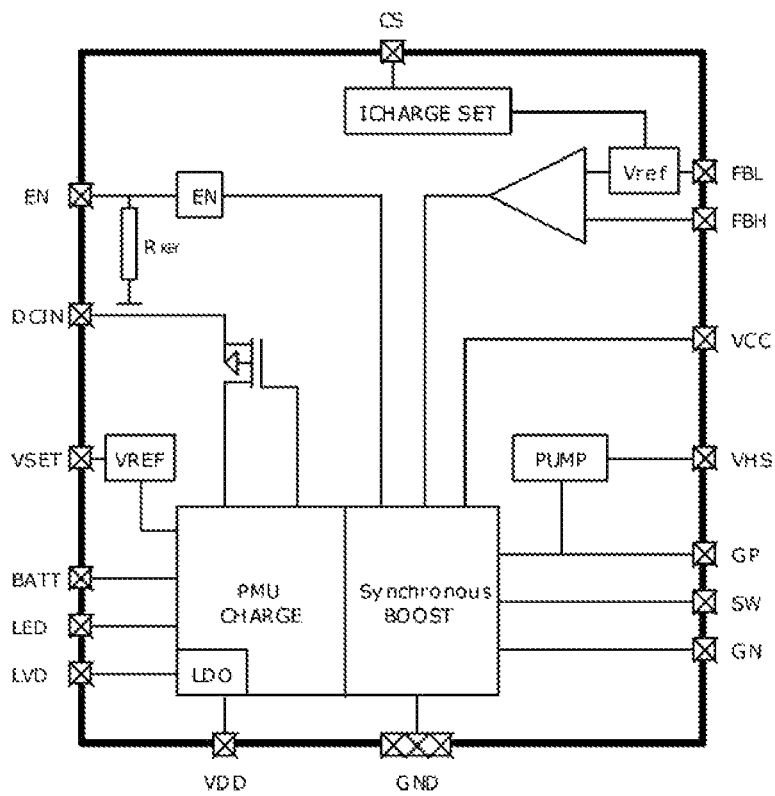
FIG. 2 is a schematic structure diagram of a power management unit U1 in FIG. 1.

Referring to FIG. 2, furthermore, the power management unit U1 includes the PMU CHARGE module, the Synchronous BOOST module, the PUMP module, the first Vref module, the ICHARGE SET module, the EN module, the second $V_{REF}$ module, the field effect transistor, the resistor $R_{KEY}$ and the amplifier. The PMU CHARGE module includes the LDO. The two output ports of the LDO are the LCD port and the VDD port of the chip respectively. The two direct output ports of the PMU CHARGE module are the LED port and the BATT port of the chip respectively. The output port of the PMU CHARGE module via the second $V_{REF}$ module (second VREF module) is the BSET port of the chip. The output port of the PMU CHARGE module via the field effect transistor is the DCIN port of the chip. The Synchronous BOOST module is connected with the PMU CHARGE module. The Synchronous BOOST module has 5 direct output ports: the GND port, the GN port, the SW port, the GP port and the VCC port of the chip. The output port of the node between the Synchronous BOOST module and the GP port via the PUMP is the VHS port of the chip. The Synchronous BOOST module is connected with the amplifier. One port of the amplifier is the FBH port of the chip, and the other port of the amplifier is connected with the first Vref module. One output port of the first Vref module is the FBL port of the chip, and the other output port, outputting through the ICHARGE SET module, is the CS port. The Synchronous BOOST module is connected with one end of the EN module. The other end of the EN module is the EN port of the chip. The node of the EN module and the EN port of the chip is connected with one end of the resistor $R_{KEY}$.

The performance of the power management unit U1 in the disclosure is shown in the following table (JH5700 electrical characteristics).

| Parameters name | Symbol | Value | Unit |
|---|---|---|---|
| VDD | $V_{MAX}$ | −0.3~6.0 | V |
| SW, DCIN, VCC | $V_{MAX}$ | −0.3~30 | V |
| BATT | $V_{MAX}$ | −0.3~18 | V |
| BST | $V_{MAX}$ | $V_{SW} - 0.3 \sim V_{SW} + 6$ | V |
| GH | $V_{MAX}$ | $V_{SW} - 0.3 \sim V_{BST} + 0.3$ | V |
| ALL OTHER PIN | $V_{MAX}$ | $0.3 \sim V_{DD} + 0.3$ | V |
| Working temperature | $T_{OPE}$ | −40 to +85 | °C. |
| Chip junction temperature | $T_J$ | −40 to +125 | °C. |
| Storage temperature | $T_{STG}$ | −60 to +150 | °C. |
| Reflow soldering temperature | $T_{SOLD}$ | 300 | °C. |

The maximum power consumption of the disclosure depends on three factors: $T_{JMCSC}$, $T_A$, and $\theta_{JA}$, and the calculation formula is $P_{DMCSC}=(T_{JRMCSC}-T_A)/\theta_{JA}$. The $T_{JMCSC}$ of the JH5700 circuit is 125° C., the $T_A$ is the temperature of the external environment, and the $\theta_{JA}$ depends on different packaging forms (the $\theta_{JA}$ of QFN packaging is 130° C./W). The larger the external heat dissipation area, the lower the thermal resistance.

The electrical characteristics of the power management unit U1 (JH5700 electrical characteristics) of the disclosure are shown in the following table ($T_A$=25° C., $V_{IN}$=5V, $V_{DD}$=3.6V unless otherwise specified).

| Parameters name | Symbol | Test Conditions | Minimum | Typical | Maximum | Unit |
|---|---|---|---|---|---|---|
| Summary | | | | | | |
| Range of output voltage | $V_{CC}$ | | 0 | | 24 | V |
| Resting current | $I_{DD}$ | Standby mode | | 50 | 100 | uA |
| | | Operating mode | | 1 | 3 | mA |
| Low-voltage threshold | $V_{LVD}$ | $R_{VSET}$ = 10K | | 3.4 | | V |
| | | $R_{VSET}$ = 33K | | 6.8 | | |
| | | $R_{VSET}$ = 100K | | 10.2 | | |
| | | $R_{VSET}$ = 330K | | 11.0 | | |
| Enable port pull-down resistor | $R_{KEY}$ | | | 1.7 | | MΩ |
| Output voltage of VCC | $V_{CC}$ | | 4.8 | 5.1 | 5.3 | V |
| Thermal protection shutdown temperature | $T_{SD}$ | | | 140 | | °C. |
| Lithium battery charging part | | | | | | |
| Trickle charging threshold | $V_{TK}$ | | | 2.83 | | V/cell |
| Trickle charging current | $I_{TK}$ | $R_{CS}$ = 50 mΩ | | 250 | | mA |
| Constant-current charging current | $I_{CHG}$ | $R_{CS}$ = 50 mΩ | | 1000 | | mA |
| Voltage reference for current detection | $V_{CS}$ | | 40 | 50 | 60 | mV |
| Preset charging voltage | $V_{PRESET}$ | RVSET = 330K | 4.15 | 4.20 | 4.25 | V |
| | | RVSET = 100K | 8.30 | 8.40 | 8.50 | |
| | | RVSET = 33K | 12.4 | 12.6 | 12.8 | |
| | | RVSET = 10K | 13.8 | 14.1 | 14.4 | |
| Final charging current | $I_{END}$ | RCS = 50 mΩ | | 250 | | mA |
| Normal charging time | $t_{timer1}$ | | | 12 | | hours |
| Trickle charging time | $t_{timer2}$ | | | 1 | | hours |
| Boost conversion part | | | | | | |
| FB reference voltage | $V_{REF}$ | FBH and FBL | 2.05 | 2.10 | 2.15 | V |
| Operating frequency | $f_{SW}$ | | | 350 | | kHz |
| Soft start time | $t_{SS}$ | | | 0.3 | | ms |
| Current-limiting source/drain voltage of MOS transistor | $V_{DS}$ | | | 230 | | mV |

The disclosure also has the following technical characteristics.

1. Preset charging voltage: For different requirements of lithium battery, the pre-charging voltage of lithium battery can be set by the resistance of resistor RSET under VSET pin. Recommended resistors for typical voltage as shown in the following table.

| $R_{SET}$ | Battery Type | $V_{PRESET}$ |
|---|---|---|
| 330kΩ | Lithium 1 cell | 4.20 V |
| 100kΩ | Lithium 2 cell | 8.40 V |
| 33kΩ | Lithium 3 cell | 12.6 V |
| 10kΩ | Lead-acid | 14.1 V |

Preset charging current: According to different requirements, the charging current can be set by the RSET resistor. The normal charging current value is:

$$I_{CHG} = \frac{V_{CS}}{R_{SET}}$$

wherein VCS=50 mV. If RSET=50 mΩ, the charging current is 1000 mA.

Trickle charging current: when the voltage of the lithium battery is lower than $V_{TRK}$(2.8V*N-cell), the charger will charge the battery with low current $I_{TRK}$.

$$I_{TRK} = \tfrac{1}{4} I_{CHG}$$

| Battery Type | $V_{TRK}$ |
|---|---|
| Lithium 1 cell | 2.80 V |
| Lithium 2 cell | 5.60 V |
| Lithium 3 cell | 8.40 V |
| Lead-acid | 9.16 V |

Charge termination: When the battery is charged to $V_{PRESET}$ and the charging current drops below $I_{END}$, the battery is full and the charging cycle is complete.

$$I_{END} = \tfrac{1}{4} I_{CHG}$$

LED charging indication is as shown in the following table.

| Charging mode | LED indication |
|---|---|
| No charging | Always off |
| Normal charging | ¼ HZ flashing |
| full charging | Always on |

Charging time protection: if the battery is not fully charged after 1 hour of trickle charging or 12 hours of normal charging, the charging will be stopped. By default, the battery is a bad battery.

Charging adaptive voltage: For different adapters, when the charging input voltage is lower than VCC, DCIN can be pulled high to forcibly switch to the charging mode. The function will not damage the adapter due to overload. If the adapter voltage is higher than the set output voltage 0.5V, it will automatically convert boost to step-down charging.

LDO voltage regulator: the system power supply voltage is linearly stepped down from OUT to obtain a higher voltage, wherein the typical value VDD=5.5V. The system voltage is without loading capacity, thus cannot be used externally to avoid damage to the circuit. The maximum current is 8 mA. If the VDD voltage is too low, the boost operation will be shut-down.

Charging protection: JH5700 has a complete protection function. The product has a soft-start function to prevent malfunctions caused by excessive inrush current during startup and integrates protection functions such as output over-current protection, short-circuit protection, under-voltage protection, and over-temperature protection to ensure stable and reliable operation of the system.

In order to better illustrate the structural characteristics, the disclosure will now be further illustrated as follows in connection with FIG. 3.

The R1, R2, and R3 in FIG. 3 correspond to the RH, RM, and RL in the following formula. The Q1, Q2, and L1 in FIG. 1 correspond to the Q1, Q2, and L1 in FIG. 3. The C2 in FIG. 1 corresponds to the C1 in FIG. 3, and the C4 in FIG. 1 corresponds to the C2 in FIG. 3.

Figure 3:
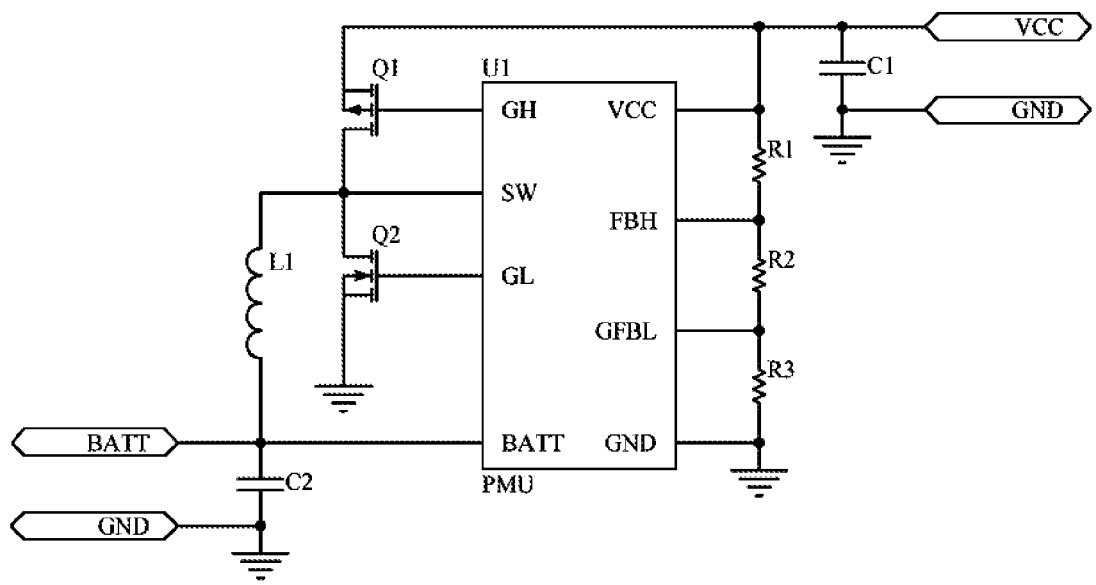
FIG. 3 is a simplified schematic diagram of FIG. 1.

Referring to the circuit in FIG. 3, the BATT/GND is the battery interface, and the VCC/GND is the charging-discharging interface. The Q1, Q2, and L1 in FIG. 3 are controlled by U1 and together form a voltage boost/step-down circuit. The R1, R2, and R3 are feedback resistors, used to set the discharging voltage and charging voltage.

When discharging, the boost/step-down circuit will take power from the battery port (BATT/GND) and boost it to the output port (VCC/GND). The output voltage (VOUT) is set by the internal reference voltage (VREF) of U1 and the external resistors (R1, R2 and R3).

$$V_{OUT} = \frac{R_H + R_M + R_L}{R_M + R_L} \times V_{REF}$$

When discharging, if the voltage of VCC is higher than the charging critical point (VIN), the circuit will enter the charging mode. When charging, the boost/step-down circuit will take power from the input port (VCC/GND) and step it down to the battery port (BATT/GND) to charge the battery.

$$V_{IN} = \frac{R_H + R_M + R_L}{R_L} \times V_{REF}$$

When VIN is set higher than VOUT, the boost/step-down circuit will maintain VCC at a set voltage (VOUT). The load can be connected to the VCC for power. If an external power supply higher than VIN is connected to VCC, the boost/step-down circuit will charge the battery. Thus we can realize discharging and charging functions on the same interface (VCC/GND).

The invention claimed is:

1. A single-interface charging-discharging switchable circuit, comprising:
    a power management unit, said power management unit further comprising:
    a first resistor, said first resistor having a first end and a second end;
    a second resistor, said second resistor having a first end and a second end;
    a third resistor, said third resistor having a first end and a second end;
    a fourth resistor, said fourth resistor having a first end and a second end;
    a fifth resistor, said fifth resistor having a first end and second end;

a sixth resistor, said sixth resistor having a first end and a second end;
a seventh resistor, said seventh resistor having a first end and a second end;
an eighth resistor, said eighth resistor having a first end and a second end;
a first capacitor, said first capacitor having a first end and second end;
a second capacitor, said second capacitor having a first end and a second end;
a third capacitor, said third capacitor having a first end and a second end;
a fourth capacitor, said fourth capacitor having a first end and a second end;
a fifth capacitor, said fifth capacitor having a first end and a second end;
an inductor, said inductor having a first side and a second side;
a diode, said diode having an anode and a cathode;
an LED port which is a charging indicator;
an LVD port, which is a discharging indicator;
an EN port which is an enabling control boost;
a VDD port which is an internal system power supply;
a GND port to ground;
a VSET/NTC port which is a battery voltage selection port;
a CS port which is for charging current detection;
a BATT port for a battery connection;
a GN port which is a low end MOS gate drive;
an SW port which is a connected inductor;
a GP port which is a high end MOS gate drive;
a VHS port which is a high end MOS bootstrap;
an FBH port which is feedback high;
an FBL port which is feedback low; and
a DCIN port which is a low voltage charging input detector wherein said first end of said first resistor, said first end of said second resistor and said anode of said diode are connected together and wherein said second end of said first resistor is grounded and wherein said second end of said second resistor is connected with said DCIN port of said power management unit;
a VCC port, said VCC port further comprises:
a field effect transistor with a gate that is connected with said GP port of said power management unit;
a drain that is connected with said SW port of said power management unit and said first end of said inductor;
wherein said cathode of said diode, said first end of said fifth resistor, said first end of said first capacitor, said first end of said second capacitor are connected together with said field effect transistor;
and wherein said second end of said first capacitor is connected with said VHS port of said power management unit;
and wherein said second end of said second capacitor is grounded;
and wherein said second end of said fifth resistor is connected with said FBH port of said power management unit and said first end of said fourth resistor;
and wherein said second end of said fourth resistor is connected with said FBL port of said power management unit and said first end of said third resistor;
and wherein the opposite end of said third resistor is grounded and wherein said second end of said inductor is connected with said BATT port of said power management unit and said first end of said fourth capacitor;
and wherein said first end of said seventh resistor is connected with said first end of said eighth resistor;
and wherein a co-node of said second end of said inductor, said BATT port of said power management unit;
and wherein a said first end of said fourth capacitor is a positive electrode of a power supply in said circuit;
and wherein a co-node of said first end of said seventh resistor and said first end of said eighth resistor is a negative electrode of said power supply in said circuit;
and wherein said second end of said seventh resistor is connected with said CS port of said power management unit and said first end of said fifth capacitor;
and wherein said second end of said eighth resistor, said second end of said fourth capacitor, said second end of said fifth capacitor and said GND port are all grounded;
and wherein said VSET/NTC port of said power management unit is grounded via said sixth resistor;
and wherein said EN port of said power management unit and said VDD port of said power management unit are connected with said first end of said third capacitor;
and wherein said second end of said third capacitor is grounded; and
a second field effect transistor wherein a gate of said field effect transistor is connected with said GN port of said power management unit wherein a source of said field effect transistor is grounded.

2. The single-interface charging-discharging switchable circuit of claim 1, wherein said circuit supports 5-24V input to charge lithium or lead-acid batteries with a maximum charging current up to 4A.

3. The single-interface charging-discharging switchable circuit of claim 1, wherein said power supply is connected between a positive electrode and a negative electrode of a power supply in said circuit wherein a first end of said power supply is connected with said co-node of said second end of said inductor, said BATT port of said power management unit and said first end of said fourth capacitor wherein said co-node is the positive electrode; a second end of said power supply is connected with said co-node formed by said first end of said seventh resistor and said first end of said eighth resistor, wherein said co-node is the negative electrode.

4. The single-interface charging-discharging switchable circuit of claim 1, wherein in a discharging mode, a converter will detect a voltage $V_{OUT}$ and a voltage $V_{IN}$ of a VCC pin and respond accordingly as follows:
if said voltage out of said VCC is higher than a charging critical point ($V_{IN}$), said circuit will enter a charging mode;
if said voltage out of said VCC is lower than said charging critical point ($V_{IN}$), said circuit will enter a battery boost mode;
if when an external adapter is connected to said VCC for power supply, and a power of the adapter is not enough and the voltage is lower than said critical point ($V_{IN}$), said converter will boost said voltage to VOUT to supplement said power supply.

5. The single-interface charging-discharging switchable circuit of claim 4, wherein the boost output voltage of the circuit is characterized to be of high-precision if VOUT=5~24V, ±2.5% and when said circuit can continuously output large current: IOP=6A, when the total power is 120 W and then said circuit has under-voltage protection for the lithium battery: VUVLO=2.83V*N.

6. The single-interface charging-discharging switchable circuit of claim 1, wherein the power management unit further comprises:
- a PMU CHARGE module, said PMU CHARGE module further comprising:
- an LDO which is a voltage regulator;
- wherein two output ports of said LDO are the LCD port and the VDD port of said chip, respectively and wherein two direct output ports of said PMU CHARGE module are said LED port and said BATT port of said chip, respectively; and
- wherein an output port of the PMU CHARGE module via the second $V_{REF}$ module (second VREF module) is a BSET port of the chip;
- and wherein an output port of said PMU CHARGE module via the field effect transistor is the DCIN port of said chip;
- a Synchronous BOOST module which is connected with said PMU CHARGE module and has 5 direct output ports, said 5 direct output ports being: said GND port, said GN port, said SW port, said GP port and said VCC port of said chip and wherein an output port of a node between a Synchronous BOOST module and a GP port via a PUMP module is the VHS port of said chip and wherein said Synchronous BOOST module is connected with an amplifier, said amplifier having one port that is said FBH port of said chip and a second port that is connected with a first Vref module wherein one output port of said first Vref module is said FBL port of said chip, and a second output port outputting through an ICHARGE SET module, which is said CS port and wherein said Synchronous BOOST module is connected with a first end of said EN module and a second end of said EN module is said EN port of said chip, a node of said EN module and said EN port of said chip is connected with a first end of a resistor $R_{KEY}$;
- a second $V_{REF}$ module; and
- a field effect transistor.

* * * * *